US009853581B2

(12) United States Patent
Armstrong et al.

(10) Patent No.: US 9,853,581 B2
(45) Date of Patent: Dec. 26, 2017

(54) LIFING AND PERFORMANCE OPTIMIZATION LIMIT MANAGEMENT FOR TURBINE ENGINE

(71) Applicants: Michael Armstrong, Avon, IN (US); Mat French, Avon, IN (US)

(72) Inventors: Michael Armstrong, Avon, IN (US); Mat French, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 803 days.

(21) Appl. No.: 14/127,098

(22) PCT Filed: Oct. 22, 2013

(86) PCT No.: PCT/US2013/066047
§ 371 (c)(1),
(2) Date: Dec. 17, 2013

(87) PCT Pub. No.: WO2014/143187
PCT Pub. Date: Sep. 18, 2014

(65) Prior Publication Data
US 2015/0042103 A1 Feb. 12, 2015

Related U.S. Application Data

(60) Provisional application No. 61/794,165, filed on Mar. 15, 2013.

(51) Int. Cl.
*G06F 19/00* (2011.01)
*H02P 9/04* (2006.01)
(Continued)

(52) U.S. Cl.
CPC ............... *H02P 9/04* (2013.01); *F01D 15/10* (2013.01); *F01D 21/12* (2013.01); *F01D 21/14* (2013.01);
(Continued)

(58) Field of Classification Search
CPC .. G05B 23/0283; G05B 15/02; G05B 23/024; G05B 23/0254; G05B 23/0294; Y02E 10/723; Y02E 10/725
See application file for complete search history.

(56) References Cited

U.S. PATENT DOCUMENTS 5,351,184 A * 9/1994 Lu ..................... G05B 13/048
700/37
5,694,765 A 12/1997 Hield et al.
(Continued)

FOREIGN PATENT DOCUMENTS

EP 2657457 A2 10/2013
JP 2010065636 A 3/2010

OTHER PUBLICATIONS

International Search Report and the Written Opinion for International Application No. PCT/US2013/066047, dated Oct. 22, 2013, (11 pages).
(Continued)

*Primary Examiner* — Darrin Dunn
(74) *Attorney, Agent, or Firm* — Barnes & Thornburg LLP

(57) ABSTRACT

A control for a multi-shaft turbine engine system using electrical machines seeks optimal system performance while accommodating hard and soft component limits. To accommodate the component limits, the control may generate a number of possible operating point options reflecting potential trade-offs in performance, lifing, efficiency, or other objectives.

10 Claims, 5 Drawing Sheets

(51) Int. Cl.
  *F01D 15/10* (2006.01)
  *F02C 7/32* (2006.01)
  *F02C 9/00* (2006.01)
  *F01D 21/12* (2006.01)
  *F01D 21/14* (2006.01)
  *H02P 101/30* (2015.01)

(52) U.S. Cl.
  CPC .............. *F02C 7/32* (2013.01); *F02C 9/00* (2013.01); *F05D 2270/06* (2013.01); *F05D 2270/101* (2013.01); *F05D 2270/11* (2013.01); *H02P 2101/30* (2015.01)

(56) References Cited

U.S. PATENT DOCUMENTS

| | | | |
|---|---|---|---|
| 5,867,979 A | 2/1999 | Newton et al. | |
| 6,823,253 B2 | 11/2004 | Brunell | |
| 7,203,554 B2* | 4/2007 | Fuller | G05B 13/048 700/121 |
| 7,219,040 B2 | 5/2007 | Renou et al. | |
| 7,285,871 B2 | 10/2007 | Derouineau | |
| 7,337,022 B2* | 2/2008 | Wojsznis | G05B 11/32 700/28 |
| 7,468,561 B2 | 12/2008 | Kern et al. | |
| 7,521,902 B2 | 4/2009 | Wiegman et al. | |
| 7,538,521 B2 | 5/2009 | Berenger | |
| 7,552,582 B2 | 6/2009 | Eick et al. | |
| 7,605,483 B2 | 10/2009 | Kern et al. | |
| 7,926,287 B2 | 4/2011 | Ullyott et al. | |
| 8,036,805 B2 | 10/2011 | Mahoney et al. | |
| 8,185,292 B2 | 5/2012 | Litt | |
| 8,304,927 B2 | 11/2012 | Cote et al. | |
| 8,613,186 B2 | 12/2013 | Koganezawa et al. | |
| 9,002,530 B2* | 4/2015 | O'Connor | F01K 13/02 429/61 |
| 2002/0123864 A1* | 9/2002 | Eryurek | G05B 23/0254 702/188 |
| 2003/0100974 A1* | 5/2003 | Alvarez | G05B 19/41885 700/286 |
| 2004/0049715 A1* | 3/2004 | Jaw | H04L 41/0681 714/43 |
| 2004/0123600 A1* | 7/2004 | Brunell | F02C 9/00 60/773 |
| 2004/0164171 A1* | 8/2004 | Eisenhour | B60H 1/00064 236/49.3 |
| 2005/0193739 A1* | 9/2005 | Brunell | G05B 13/048 60/772 |
| 2005/0209713 A1* | 9/2005 | Fuller | G05B 13/048 700/29 |
| 2005/0286179 A1* | 12/2005 | Huff | G06Q 10/04 361/20 |
| 2006/0150633 A1* | 7/2006 | McGinley | F02C 7/275 60/773 |
| 2006/0174629 A1 | 8/2006 | Michalko | |
| 2007/0240426 A1* | 10/2007 | Wiegman | F02C 9/00 60/793 |
| 2008/0188957 A1* | 8/2008 | Cutler | G05B 13/041 700/39 |
| 2009/0224599 A1 | 9/2009 | Yue et al. | |
| 2009/0302153 A1 | 12/2009 | Matasso et al. | |
| 2010/0005810 A1* | 1/2010 | Jarrell | F02C 3/107 60/792 |
| 2010/0023239 A1* | 1/2010 | Self | G06Q 50/06 701/100 |
| 2010/0066165 A1 | 3/2010 | Ganev et al. | |
| 2010/0102625 A1 | 4/2010 | Karimi et al. | |
| 2010/0133813 A1 | 6/2010 | Cote et al. | |
| 2010/0257838 A1* | 10/2010 | Mazzaro | F01D 17/02 60/39.091 |
| 2011/0036093 A1 | 2/2011 | Dooley | |
| 2011/0137575 A1* | 6/2011 | Koul | G05B 23/0245 702/34 |
| 2013/0006429 A1* | 1/2013 | Shanmugam | F02C 9/42 700/286 |
| 2013/0131951 A1* | 5/2013 | Pandey | F02C 9/16 701/100 |
| 2013/0179356 A1* | 7/2013 | Pawlowski | F01D 21/00 705/305 |
| 2013/0204468 A1* | 8/2013 | Camhi | G06F 17/00 701/3 |
| 2013/0282195 A1* | 10/2013 | O'Connor | F01K 13/02 700/291 |
| 2014/0019091 A1* | 1/2014 | Higgins | G06F 15/00 702/184 |
| 2014/0052410 A1* | 2/2014 | Tralshawala | F01D 17/04 702/183 |
| 2014/0100703 A1* | 4/2014 | Dull | G05B 17/02 700/289 |
| 2014/0123664 A1* | 5/2014 | Dion Ouellet | F02C 7/26 60/773 |
| 2014/0156165 A1* | 6/2014 | Ewens | F02C 9/28 701/100 |
| 2014/0248123 A1* | 9/2014 | Turner | F03D 7/0292 415/1 |
| 2014/0257526 A1* | 9/2014 | Tiwari | G05B 13/02 700/29 |
| 2014/0257666 A1* | 9/2014 | Abrol | F02C 9/48 701/100 |
| 2014/0290265 A1* | 10/2014 | Ullyott | F02C 7/36 60/773 |
| 2015/0020529 A1* | 1/2015 | Hoskin | F02C 3/30 60/772 |
| 2015/0081121 A1* | 3/2015 | Morgan | F01D 21/003 700/287 |
| 2015/0176498 A1* | 6/2015 | Tiwari | G05B 23/0283 700/275 |
| 2015/0184550 A1* | 7/2015 | Wichmann | G05B 13/04 700/287 |
| 2015/0185716 A1* | 7/2015 | Wichmann | F01K 23/101 700/287 |
| 2015/0247464 A1* | 9/2015 | Pandey | G05B 17/02 700/288 |
| 2015/0278414 A1* | 10/2015 | Zhou | G06F 17/5018 703/2 |
| 2016/0090913 A1* | 3/2016 | Taguchi | F02C 6/18 60/734 |

OTHER PUBLICATIONS

Zahringer, et al., "Towards the Powerhouse for More Electric Aircraft—Dedicated Engine Concepts", American Institute of Aeronautics and Astronautics Inc., Dec. 31, 2009, (7 pages).

* cited by examiner

LIFING AND PERFORMANCE OPTIMIZATION LIMIT MANAGEMENT FOR TURBINE ENGINE

CROSS REFERENCE TO RELATED APPLICATIONS

This application is a U.S. national counterpart application of international application Ser. No. PCT/US2013/066047 filed Oct. 22, 2013, which claims priority to U.S. Provisional Patent Application No. 61/794,165 filed Mar. 15, 2013. The entire disclosures of PCT/US2013/066047 and U.S.S.N 61/794,165 are hereby incorporated by reference.

FIELD OF THE DISCLOSURE

The present disclosure relates generally to turbine engines and more specifically to limit management systems for multi-shaft turbine engines.

BACKGROUND

Gas turbine engines are used to power aircraft, watercraft, power generators, and the like. Gas turbine engines typically include a compressor, a combustor, and a turbine. A fan or propeller may be used to draw air into the engine. The compressor compresses the air and delivers higher-pressure air to the combustor. In the combustor, fuel is mixed with the higher-pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

In multi-shaft turbine engines, some of the engine components may drive or be driven by different shafts. Power can be extracted from these shafts to drive, for example, an electrical system. Some gas turbine engines may include a single gearbox mounted starter/generator or PMA (permanent magnet alternator), which may be used to provide power to the electrical systems.

The components of the engine and the electrical system have operational constraints or limits, beyond which component degradation or failure may occur.

SUMMARY

The present application discloses one or more of the features recited in the appended claims and/or the following features which, alone or in any combination, may comprise patentable subject matter.

According to at least one embodiment of this disclosure, a control for a turbine engine system including a multi-shaft turbine engine and one or more electrical machines coupled to the shafts, includes a constraint analyzer to determine applicable component limits based on current operating conditions of the system, wherein each of the component limits defines an operating region in which, if the component limit is exceeded, the life or safety of the component may be compromised; and a limit management optimizer to generate a desired operating point and one or more possible operating points for the system based on the current operating conditions, the applicable component limits, and an optimization objective, wherein the one or more possible operating points each represents a functional trade-off involving a reduction in a component function to maintain the component limits, an objective trade-off involving a modification of the optimization objective to maintain the component limits, or a modification of one or more of the component limits.

In some embodiments, the limit management optimizer may select the desired operating point or one of the possible operating points, and may communicate a control signal to one or more system controllers for the system to achieve the selected operating point. The control signal may include a power extraction control signal and the control may communicate the control signal to a generator control unit configured to control the operation of a generator coupled to one of the shafts of the turbine engine system. The component limits may include one or more soft limits that if exceeded, result in a non-fatal penalty to the operation of the system. The component limits may include one or more hard limits that if exceeded, result in a failure of a component of the system. The optimization objective may include performance, efficiency, lifing, reliability and/or stability.

The limit management optimizer may communicate data relating to the desired operating point and the possible operating points to a vehicle manager, and the vehicle manager may select the desired operating point or one of the possible operating points. The vehicle manager may communicate the selected operating point to the control. The constraint analyzer may use a system model to determine the applicable component limits, and the system model may include data relating to an estimated state of the system.

According to at least one embodiment of this disclosure, a method for controlling the allocation of power extracted from a plurality of shafts of a turbine engine, the shafts having one or more electrical machines coupled thereto, includes analyzing current operating conditions of the turbine engine; determining a optimization objective, the optimization objective being to maximize one of performance, efficiency, component lifing, reliability, and stability of the turbine engine; determining a component limit based on the current operating conditions; determining a desired operating point for the turbine engine based on the current operating conditions and the optimization objective; determining whether the desired operating point violates the component limit; and determining one or more possible operating points for the turbine engine, each of the possible operating points representing one of a functional trade-off involving a reduction in the operation of a component of the turbine engine to maintain the component limit, an objective trade-off involving a modification of the optimization objective to maintain the component limit, and a modification of the component limit.

The method may include selecting one of the desired operating point and the one or more possible operating points. Any of the foregoing methods may include communicating one or more of the desired operating point and the one or more possible operating points to a vehicle manager. Any of the foregoing methods may include receiving data relating to the desired operating point and/or one or more of the possible operating points from a vehicle manager. Any of the foregoing methods may include sending a control signal to a controller to control the operation of one or more of the electrical machines, wherein the control signal relates to the desired operating point or one of the possible operating points.

According to at least one embodiment of this disclosure, a control for a turbine engine system including a multi-shaft turbine engine and one or more electrical machines coupled to the shafts may be configured to perform any of the foregoing methods.

According to at least one embodiment of this disclosure, a system for controlling the allocation of power between or among electrical machines of a turbine engine includes a low pressure turbine, coupled to the turbine engine via a low pressure shaft; a high pressure turbine, coupled to the turbine engine via a high pressure shaft; electrical machines coupled to the low pressure shaft and the high pressure shaft, the electrical machines configured to extract rotational power from the low pressure shaft and the high pressure shaft and output electrical power; controllers coupled to each of the electrical machines to control the amount of rotational (e.g., mechanical) power extracted by the electrical machines; and a limit management optimizer to, during operation of the turbine engine, adjust the allocation of power extraction between or among the electrical machines to achieve an operating point based on current operating conditions of the turbine engine, an optimization objective for the turbine engine, and a component limit of a component of the system. The system may be configured to perform any of the foregoing methods.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
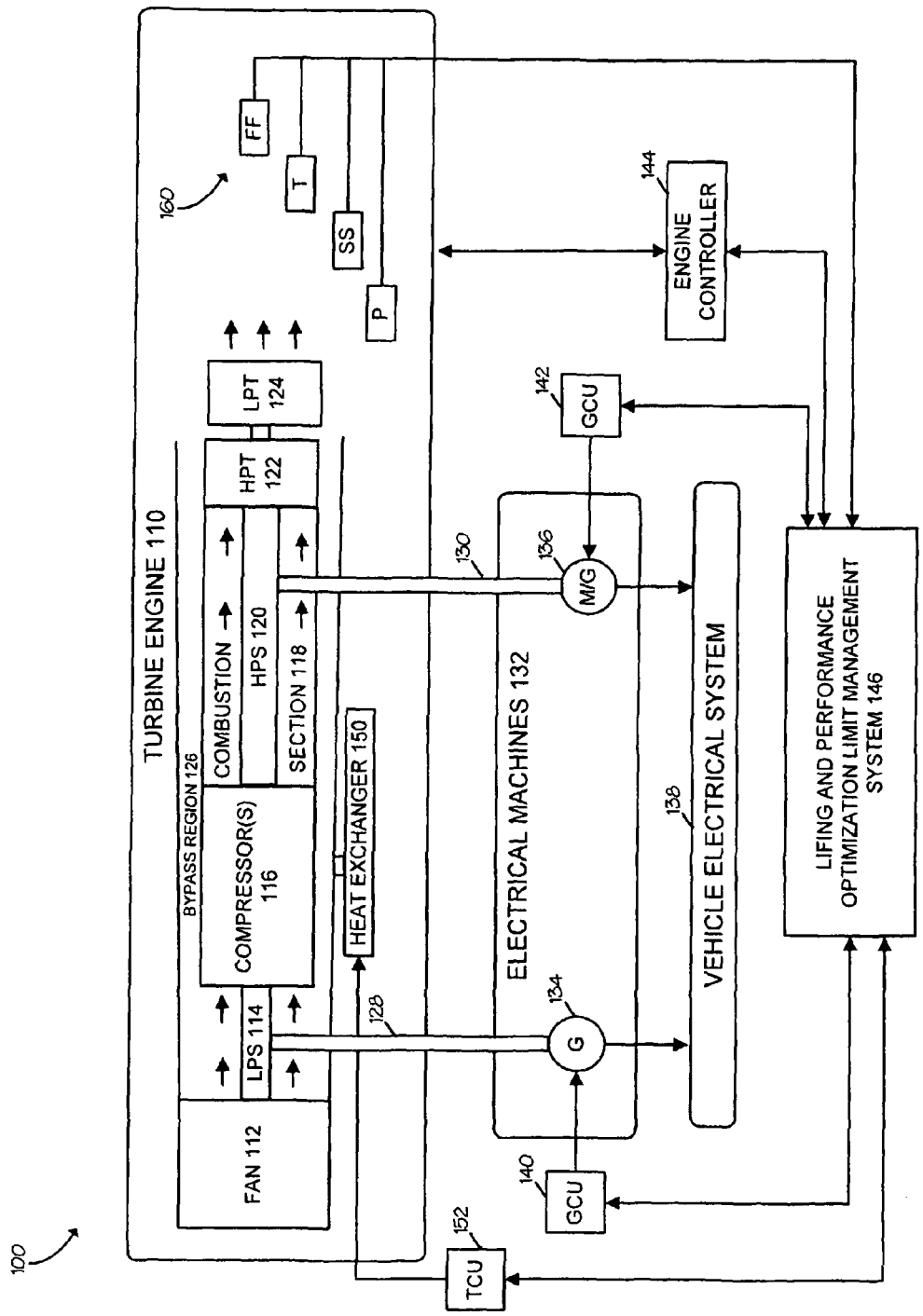
FIG. 1 is a simplified block diagram of at least one embodiment of a turbine engine system including lifing and performance optimization limit management for the turbine engine system.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Referring to FIG. 1, an embodiment of a turbine engine system 100 for controlling a multi-shaft turbine engine 110 by allocating power among components of the system 100 includes an on-line lifing and performance optimization limit management system ("limit management system") 146. As used herein, "on-line" may refer to, among other things, a computerized algorithmic process that actively seeks performance optima while the system 100 is in operation (e.g., in "real time").

The engine 110 may be used to power a vehicle, such as an aircraft. The limit management system 146 can incorporate lifing and component failure responses into the allocation of power loads on the engine 110 by varying the amount of power extracted from each of the low pressure (LP) shaft 114 and high pressure (HP) shaft 120 of the engine 110, to achieve one or more optimization objectives given the performance and/or lifing constraints or limits of the physical components of the system 100. To do this, the system 146 employs one or more computerized optimization and control algorithms and programming logic to manage hard and soft component limits, such as torque, temperature, speed, and stability, in order to maximize the performance and/or efficiency of the engine 110 and/or other system components (e.g., generator and/or thermal system components). The system 146 is configured to manage such limits even when the power loads go beyond the traditional component limits. As used herein, "optimize," "optimal," and similar terminology connotes an algorithmic process by which parameter values are mathematically computed and used to control the operation of the various components of the system 100 to achieve a desired objective, such as maximum efficiency, maximum performance, maximum component life, reliability, stability, and/or others.

In the system 146, one or more operational limitations or constraints ("limits") are known (e.g., as pre-defined data values, which may be variable or constant) for the electrical components (e.g., the generators 134, 136) of the system 100 and/or the engine 110. These limits can be classified as either "hard" or "soft" limits, and the consequences of exceeding the limits during operation of the system 100 can be represented (e.g., mathematically or numerically) as an appropriate degree of severity. Soft limits may be imposed on the system 100 as fixed boundaries that should not be crossed, but may be crossed if an appropriate penalty for doing so is imposed. In the case of soft limits, the penalty may be an adverse or negative impact on an optimization objective. Hard limits, on the other hand, are typically fixed boundaries that cannot be crossed without causing a component failure. In other words, the penalty for exceeding a hard limit is, generally, the failure of a system component. As used herein, "penalty" may refer to among other things, a calculated or pre-defined numerical value that is associated with a limit or a difference between a limit and an actual (e.g., sensed or calculated) value. For example, a larger penalty may apply if a limit is exceeded by a larger amount, and vice versa.

One or more of the component limits may vary as power requirements and/or operating conditions change. For example, according to operational specifications of the system 100, a requested power increase (e.g., x+20%), where "x" is the current power value, may not be available at a particular ratio of LP/HP generator power allocation. In order to accommodate the requested power increase, a shift in the power allocation that favors the LP shaft generator 134 may be required. Doing so may result in an increase in the required fuel flow to the engine 110. Accordingly, achieving the requested power increase may reduce the system's fuel efficiency, as a result of the component limits of the HP and LP shafts 114, 120.

As another example, suppose that a current operating requirement of the system 100 is to provide additional electrical power. Temperature limits for the engine 110 and generators 134, 136 may be known (e.g., according to manufacturer specifications). The temperature limits are often soft limits that are typically static. For example, exceeding a temperature soft limit may adversely affect the life of an engine component but not result in the failure of the component. The severity of the imposed penalty may vary depending on, for example, the amount by which the limit is exceeded or the frequency with which the limit is exceeded. Operating beyond a limit by a certain amount may cause a corresponding amount of degradation in the life of the component, thereby requiring the component to receive additional maintenance. In some cases, operating beyond a soft limit, even if permitted (e.g., for a certain amount of time), may impact other components or subsystems of the system 100, thereby cascading the effect of exceeding the soft limit, resulting in other limit violations. In other cases, operating beyond a soft limit may prove detrimental to one component, but beneficial to the rest of the system 100, thereby necessitating the "sacrifice" of one component for the betterment of, for example, increased overall system performance.

Continuing the above example, increasing the electrical power at maximum thrust can yield component temperature increases that may be warranted in some operating scenarios, but may impact the maintenance schedule or life expectancy for the engine or the electrical system. However, if the power increase allows the vehicle to avoid harm or achieve some other currently important objective, then the maintenance or life expectancy impacts to the electrical system and the engine may be an acceptable trade-off to achieve the current system objective.

Referring now in more detail to FIG. 1, in some embodiments, the limit management system 146 may be embodied in an engine controller 144 (which may be embodied as, for example, a Full Authority Digital Engine Controller or FADEC), one or more generator control units 140, 142, one or more thermal control units 152, or a combination of any of these. In other embodiments, the limit management system 146 may be embodied in a separate controller that is in communication with the system 100 via, for example, one or more electronic communication links, such as a secure data bus or network.

The illustrative turbine engine 110 is a multi-shaft turbofan gas turbine engine; however, aspects of the present disclosure are applicable to other types of multi-shaft turbine engines, including various types of turbofan and turboshaft systems. In the turbine engine 110, a fan 112 (e.g., a fan, variable pitch propeller, etc.) draws air into the engine 110. Some of the air may bypass other engine components via a bypass region 126 (e.g., a bypass duct), and thereby generate propulsion thrust. A heat exchanger 150 may receive air flow from the bypass region 126 to provide cooling flow through the bypass region 126. The remaining air is forwarded to one or more compressors 116. For instance, in some embodiments, a low pressure compressor may increase the pressure of air received from the fan 112, and a high pressure compressor may further increase the pressure of air received from the low pressure compressor. In any event, the compressor(s) 116 increase the pressure of the air and forward the higher-pressure air to a combustion section 118.

In the combustion section 118, the pressurized air is mixed with fuel, which is supplied to the combustion section 118 by a fuel supply such as a fuel injector (not shown). Typically, a flow meter, flow control valve, or similar device (e.g., a fuel flow sensor, FF 126) monitors and/or regulates the flow of fuel into the combustion section 118. An igniter (not shown) is typically used to cause the mixture of air and fuel to combust. The high-energy combusted air is directed to one or more turbines 122, 124. In the illustrative embodiment, a high pressure turbine 122 is disposed in axial flow series with a low pressure turbine 124. The combusted air expands through the turbines 122, 124, causing them to rotate. The combusted air is then exhausted through, e.g., a propulsion nozzle (not shown), which may generate additional propulsion thrust.

The rotation of the turbines 122, 124 causes the engine shafts 114, 120, to rotate. More specifically, rotation of the low pressure turbine drives a low pressure shaft 114, which drives the fan 112. Rotation of the high pressure turbine 122 drives a high pressure shaft 120, which drives the compressor(s) 116. In some embodiments, the shafts 114, 120 may be concentrically disposed. In some embodiments, more than two shafts 114, 120 may be provided. For example, in some embodiments, an intermediate shaft is disposed concentrically between the low pressure shaft 114 and the high pressure shaft 120 and supports an intermediate-pressure compressor and turbine. In such embodiments, the limit management system 146 controls the power allocation among all of the available shafts in a similar manner to that described herein.

The illustrative turbines 122, 124 additionally drive one or more electrical machines 132 via respective power take-off assemblies 128, 130. The low pressure turbine 124 drives a generator 134 via the low pressure shaft 114 and the power take-off assembly 128. The high pressure turbine 122 drives a motor/generator 136 via the high pressure shaft 120 and the power take-off assembly 130. The electrical machines 132 can generate electrical power, which may be supplied to an aircraft electrical system 138, for example. For instance, the generator 134 may generate electrical power that is supplied to other components or systems of the aircraft or other vehicle to which it is coupled. The motor/generator 136 may operate similarly, but may additionally have a motor mode in which it receives electrical energy from, for example, the aircraft electrical system 138, and converts the received electrical energy into rotational (e.g., mechanical) power, which is then supplied to the high pressure turbine 122 via the power take-off assembly 130.

In some embodiments, the engine controller 144 controls the overall operation of the engine 110. For example, the engine controller 144 may control the rate of fuel flow to the combustion section 118, as well as the airflow through the engine 110 (e.g., by varying the pitch angle of vanes of the fan 112). The engine controller 144 receives electrical signals from a number of different sensors 160, which are installed at various locations on the engine 110 and/or other components of the system (e.g., the generators 134, 136 and heat exchanger 150), to sense various physical parameters such as temperature (T), shaft speed (SS), air pressure (P), and fuel flow (FF). These parameters represent various aspects of the current operating condition of the engine 110. In other words, the current operating condition of the engine 110 can be represented as a combination of data values for temperature, shaft speed, air pressure, and fuel flow. The sensors 160 supply electrical signals representing instantaneous values of the sensed information over time, to the engine controller 144 and/or the limit management system 146. In response to the sensor signals, the engine controller 144 supplies various commands to the engine 110 to control various aspects of the operation of the engine 110.

The generator control units 140, 142 electronically control the operation of the generators 134, 136, respectively. That is, the generator control units 140, 142 adjust the operating parameters of the generators 134, 136 at times (e.g., periodically or continuously) to vary the amount of rotational energy that the generators 134, 136 draw from the shafts 114, 120, respectively. For instance, the generator control unit 140 may configure the generator 134 to either generate electrical energy or not generate electrical energy, based on current operating conditions. Similarly, the generator control unit 142 may configure the motor/generator 136 to operate either in motor mode (in which it converts electrical energy to rotational power) or generator mode (in which it generates electrical energy from rotational power), or neither of the above, based on current operating conditions. Additionally, the generator control units 140, 142 control the amount of electrical energy that is generated by the generators 134, 136, respectively, based on control signals received from the limit management system 146.

The thermal system control unit 152 electronically controls the operation of the heat exchanger 150. For example, the thermal system control unit 152 may turn the heat exchanger 150 on or off, or increase or decrease the amount of cooling flow produced by the heat exchanger 150, based on the current operating conditions of the system 100.

In some embodiments, the limit management system 146 communicates with the engine controller 144 to obtain the parameter values sensed by the sensors 160, or otherwise obtains those parameters generated by the sensors 160 (e.g., via an electrical communication link, bus, or network). Based on the current operating conditions of the system 100 as reflected in the sensed parameter values, the limit management system 146 computes an optimal response to the component-level constraints (e.g., hard and soft limits), according to one or more optimization objectives. Such optimization objectives may include lifing, performance, fuel efficiency, reliability, stability. The optimization objectives may be specified in advance (e.g., by user input or pre-configuration of the system) and/or established or adjusted during operation of the system 100. For example, the optimization objective may be different for different phases of a flight plan, and may be adjusted dynamically during operation of the system 100, as described herein.

The limit management system 146 sends commands to one or more of the system controllers 140, 142, 144, 152, to implement the dynamically-determined constrained optimal power allocation, which is computed as described herein. For example, the limit management system 146 may determine that, given the current component-level constraints and the current system operating conditions, an optimal percentage of power extraction for each shaft 114, 120 may be 55% for the low pressure shaft 114 and 45% for the high pressure shaft 120. In this case, the limit management system 146 sends control signals corresponding to the determined optimal power allocation (e.g., 55%/45%) to the appropriate generator control units 140, 142 to command the generators 134, 136 to extract the appropriate load (e.g., a torque value or ratio such as 10 horsepower/20 horsepower) from the respective shafts 114, 120.

As another example of how the system 146 may use constrained optimization techniques to determine an optimal system response in view of component limits, suppose that the system 100 receives a demand for additional power, and the current optimization objective of the system 100 is to maximize fuel efficiency. Suppose that fuel efficiency can be maximized by minimizing the fuel flow to the engine 110. The fuel flow can be measured by a flow meter 160, as mentioned above. Suppose that the demand for additional power may be accommodated by adjusting the ratio of power provided by the generators 134, 136 mounted to the shafts 114, 120. However, each of the generators 134, 136 has certain operational constraints, which may include, for example, a torque limit, a speed limit, and/or a temperature limit. Any of these limits may be exceeded, with corresponding consequences or penalties.

In this example, the system 146 can determine an operating point that maximizes the fuel efficiency while achieving the requested power demand, but the computed optimal operating point may violate one or more of the applicable component limits. In some embodiments, the component limits are represented as a combination of a direct constraint (e.g., the limit value or boundary itself, which may be a function of one or more of the current operating conditions), and an indirect penalty function (e.g., a function that determines the impact of exceeding the limit). The direct constraints may be defined by, for example, component safety specifications. That is, if the direct constraint (or limit) is exceeded, safe operation of the component may be compromised as indicated by the component safety specifications. An indirect penalty function may be defined by, for example, component lifing specifications. In other words, if the indirect limit is exceeded, the penalty may be that the length of the component's operational life may be compromised, in accordance with the component lifing specifications.

Figure 4:
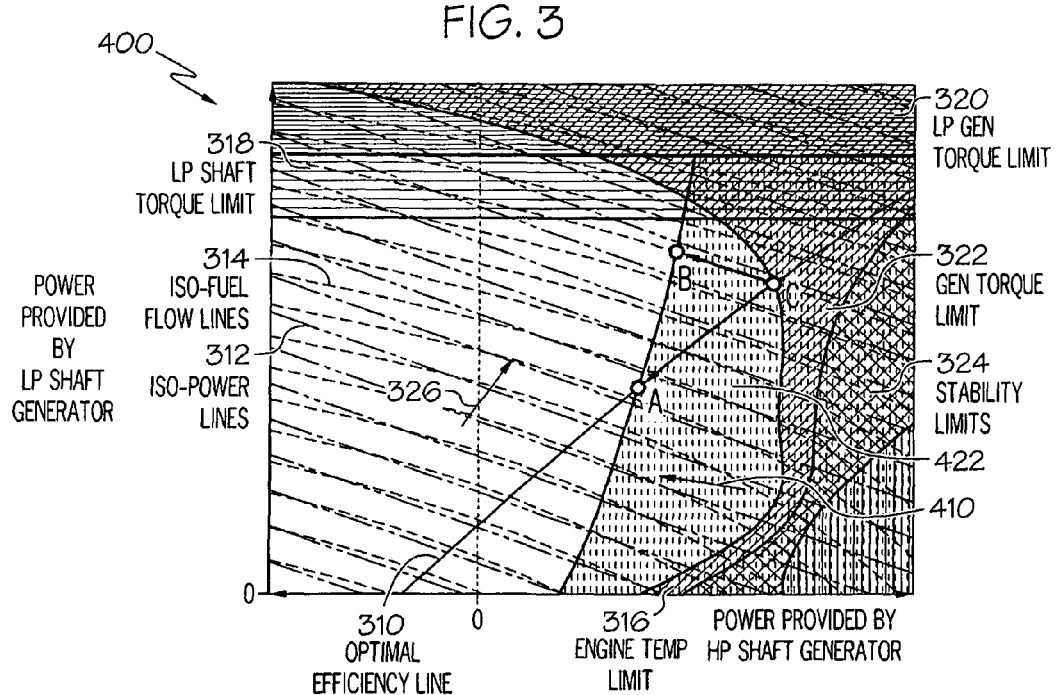
FIG. 4 is a simplified plot of power provided by a high pressure shaft-mounted generator in relation to power provided by a low pressure shaft-mounted generator of a turbine engine system, limit regions, including a region defined in response to a component failure, an optimal efficiency line, and possible engine operating points in relation thereto.

The system 146 considers the applicable component limits and formulates one or more (constrained) optimal responses. In some embodiments, the system 146 may generate a number of different optimal response options (e.g., "candidate" responses) that specify different types of system adjustments. For example, some of the candidate responses may involve adjusting one or more of the applicable component limits, and other candidate responses may involve adjusting the current optimization objective. For example, in the case where additional power is demanded but the current optimization objective is fuel efficiency, one option may be to limit the provision of additional power by load shedding; that is, to accommodate the additional power demand by one component by reducing or cutting off the supply of power to other components. Another option may be to recast the optimization objective to make component lifing a higher priority than fuel efficiency. In response to a recast objective, the system 146 may determine that an optimal response is to provide the additional power while maintaining all of the applicable soft limits (e.g., at a cost to efficiency). A further option may be to maintain the current optimization objective of efficiency and make performance a higher priority than component lifing. In this case, the system 146 may determine that an optimal response is to provide the additional power at a cost to component life, but to do so while retaining optimal system efficiency. In these and other ways, the system 146 can adjust, or propose an adjustment, to the current optimization objectives in order to satisfy the immediately-required performance needs while accommodating component limits and the corresponding penalties. The system 146 can respond to failure scenarios using a similar process, as illustrated by FIG. 4, described below.

Figure 2:
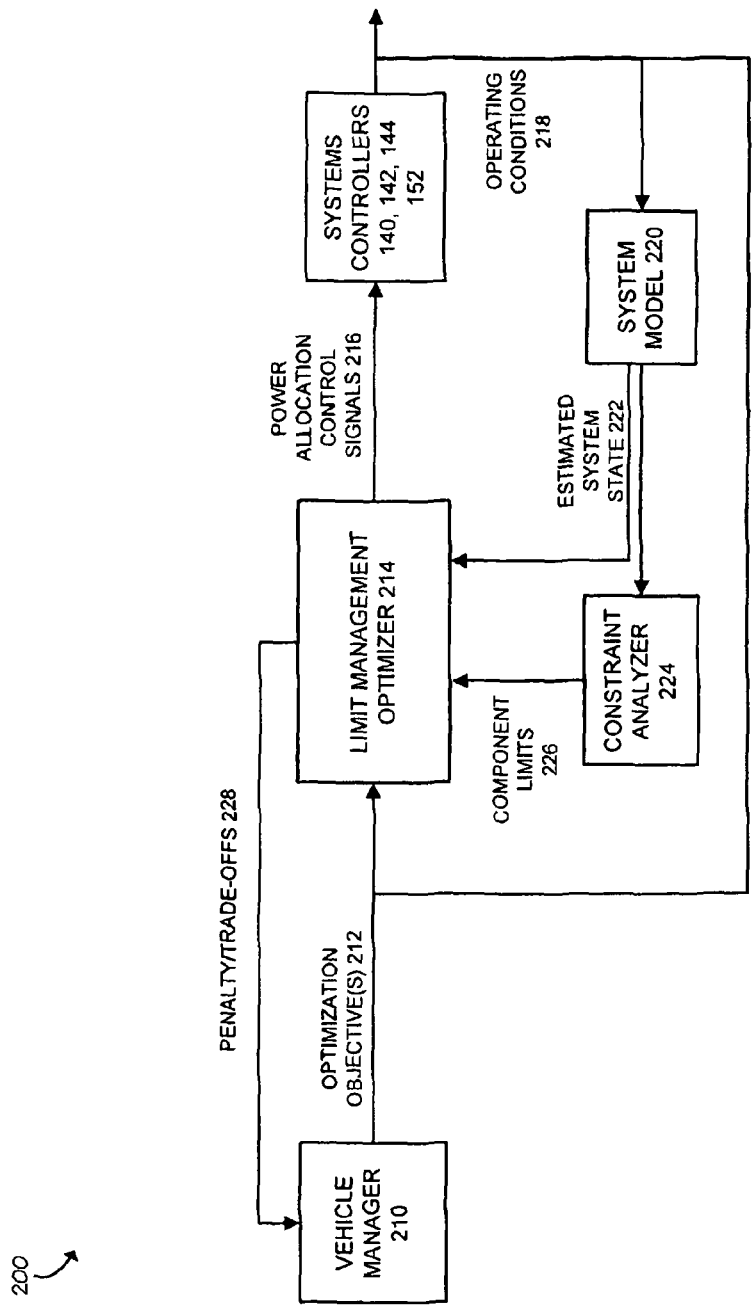
FIG. 2 is a simplified flow diagram of at least one embodiment of a method for providing optimal power allocation among the electrical machines of a turbine engine system to achieve an optimization objective while managing lifing and performance limits of the turbine engine and electrical machines.

Referring now to FIG. 2, an embodiment 200 of the limit management system 146 is shown. The system 200 is embodied as a number of computerized components (e.g., executable modules and data structures), including a vehicle manager module 210, a limit management optimizer 214, a constraint analyzer module 224, and a system model 220. While shown in FIG. 1 as a unitary system 146, it should be understood that portions of the components 210, 214, 220, 224 may be distributed, e.g., among or across various control units of the system 100 and connected by a vehicle network). For example, in some cases, the limit management optimizer 214 may be embodied as the system 146 while the other components 210, 220, 224, are embodied in one or more other control units of the system 100, or may represent an element of human participation, as described below.

One or more optimization objectives 212 are supplied to the limit management optimizer 214 (e.g., defined prior to system operation, by user input, and/or periodically defined or updated during operation of the system 100). The optimization objectives 212 can be set to maximize fuel efficiency, component life, reliability, or engine performance metrics. Some examples of engine performance metrics include available power and surge margin. In general, the optimization objectives 212 are defined in accordance with the requirements of a particular design or operating scenario of the system 100.

In some embodiments, the optimization objectives 212 are supplied by the vehicle manager 210. As used herein, "vehicle manager" may refer to a human operator, such as a pilot or equipment owner, or to an automated system or process. For example, the vehicle manager 210 may include a computer system or process that may be programmed or configured to act as an agent or delegate, of or on behalf of a human operator. Where multiple optimization objectives 212 are specified, the optimization objectives 212 may be specified with an associated level of priority. The priority levels of the objectives 212 may be designated as fixed or variable. For instance, for some vehicles or under some operating conditions, performance may always be the highest priority objective 212 (e.g., fixed), while in other vehicles or operating scenarios, component lifing or efficiency may have the highest priority initially but may be sacrificed for performance if the current operating conditions change (e.g., variable).

Data relating to the current operating conditions 218 are obtained, directly or indirectly (e.g., by calculations based on current values) from the sensors 160, over time during the operation of the system 100. The limit management optimizer 214 analyzes the current operating conditions (e.g., system states) 218 in view of the optimization objectives 212, the system model 220, and any applicable component limits 226, and applies optimal control methods to determine a desired or optimal operating point for the system 100.

The optimal control methods executed by the limit management optimizer 214 may include, for example, nonlinear optimization methods such as gradient-based methods. Where one or more component limits are relevant, the optimizer 214 may employ one or more constrained optimization techniques such as branch and bound or bucket elimination methods. As used herein, "operating point" may refer to, among other things, a mathematical or numerical combination of sensed or calculated operational parameter values; for instance, LP and HP shaft torque, fuel flow, engine temperature, stability, power, power extraction percentages for the high and low pressure generators 134, 136, rate of cooling flow, thrust, and/or others. The limit management optimizer 214 sends the computed optimal parameter values to the corresponding system controllers 140, 142, 144, 152, as one or more control signals 216.

During operation of the system 100, data representing the current operating conditions 218 are fed over time into the system model 220. The system model 220 includes a mathematical or estimated representation of the current state of the system 100 (where a "state" refers to one or a combination of actual or estimated operating conditions of the system 100 at a given point in time). In general, the term, "model" refers to a mathematical model; that is, mathematical equations or algorithms and parameters that can be used to create a mathematical or numerical estimated representation of the various controlled aspects of the system 100. Some examples of numerical algorithms that may be used by the optimizer include any suitable nonlinear optimization model. For instance, a gradient-based method such as an Augmented LaGrangian method may be used in some embodiments. In addition to supplying information to the constraint analyzer 224, described below, the system model 220 communicates data relating the estimated system state 222 to the optimizer 214, so that the optimizer 214 can assess the performance of the system 100 in response to changes to the controls inputs (e.g., the control signals 216).

Based on the estimated current state of the system 100, the constraint analyzer 224 determines whether any component-level limits have been reached or exceeded, and whether such limits are hard limits or soft limits. Using the component limit information supplied by the constraint analyzer 224, the limit management optimizer 214 may determine one or a number of desired or optimal operating points for the system 100. For example, based on the current optimization objective, it may be acceptable to adjust one or more of the component limits. In other cases, it may be more desirable to change the optimization objective, or continue with the current optimization objective, rather than adjusting the component limit.

In some embodiments, the limit management optimizer 214 can provide knowledge 228 (e.g., penalties or trade-offs) of the consequences of operating beyond the limits 226 to the vehicle manager 210. In some embodiments, the limit management optimizer 214 allows the vehicle manager 210 to determine or modify optimization objectives when "hard" or "soft" component limits are reached or exceeded. For instance, the limit management optimizer 214 may allow the vehicle manager 210 to make trade-offs between or among, for example, fuel efficiency, performance, and component lifecycle objectives, based on the current operating needs (e.g., the current vehicle operating mode). As an example, an automated vehicle maintenance system may have access to data that indicates that the engine 110 is scheduled for maintenance within a short amount of time after the current operation is complete. In that case, the automated system, acting as the vehicle manager 210, may allow a requested power increase to occur at the expense of component life.

In some embodiments, the limit management optimizer 214 formulates the available trade-off options 228 taking into account all or a number of different component limits and operating conditions, and communicates the trade-off options 228 to the vehicle manager 210 for evaluation and decision-making (using, e.g., an electronic communications link, visual display, or the like). The vehicle manager 210 may determine that a particular trade-off or penalty 228 is acceptable, or may supply new or additional optimization objectives 212 (in which case the limit management optimizer 214 determines the most appropriate trade-off option, or determines whether the penalty is acceptable). Based on the selected option, the limit management optimizer 214 determines an optimal power allocation, formulates the appropriate control signals 216, and communicates the control signals to the appropriate systems controllers 140, 142, 144, 152.

Figure 3:
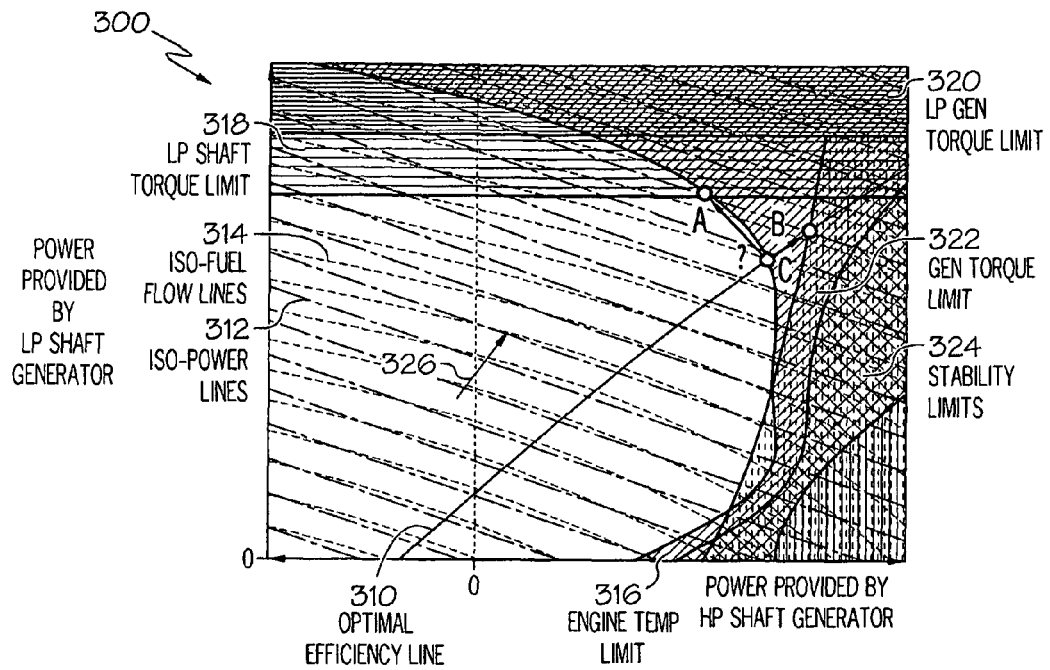
FIG. 3 is a simplified plot of power provided by a high pressure shaft-mounted generator in relation to power provided by a low pressure shaft-mounted generator of a turbine engine system, limit regions, an optimal efficiency line, and possible engine operating points in relation thereto.
Figure 5:
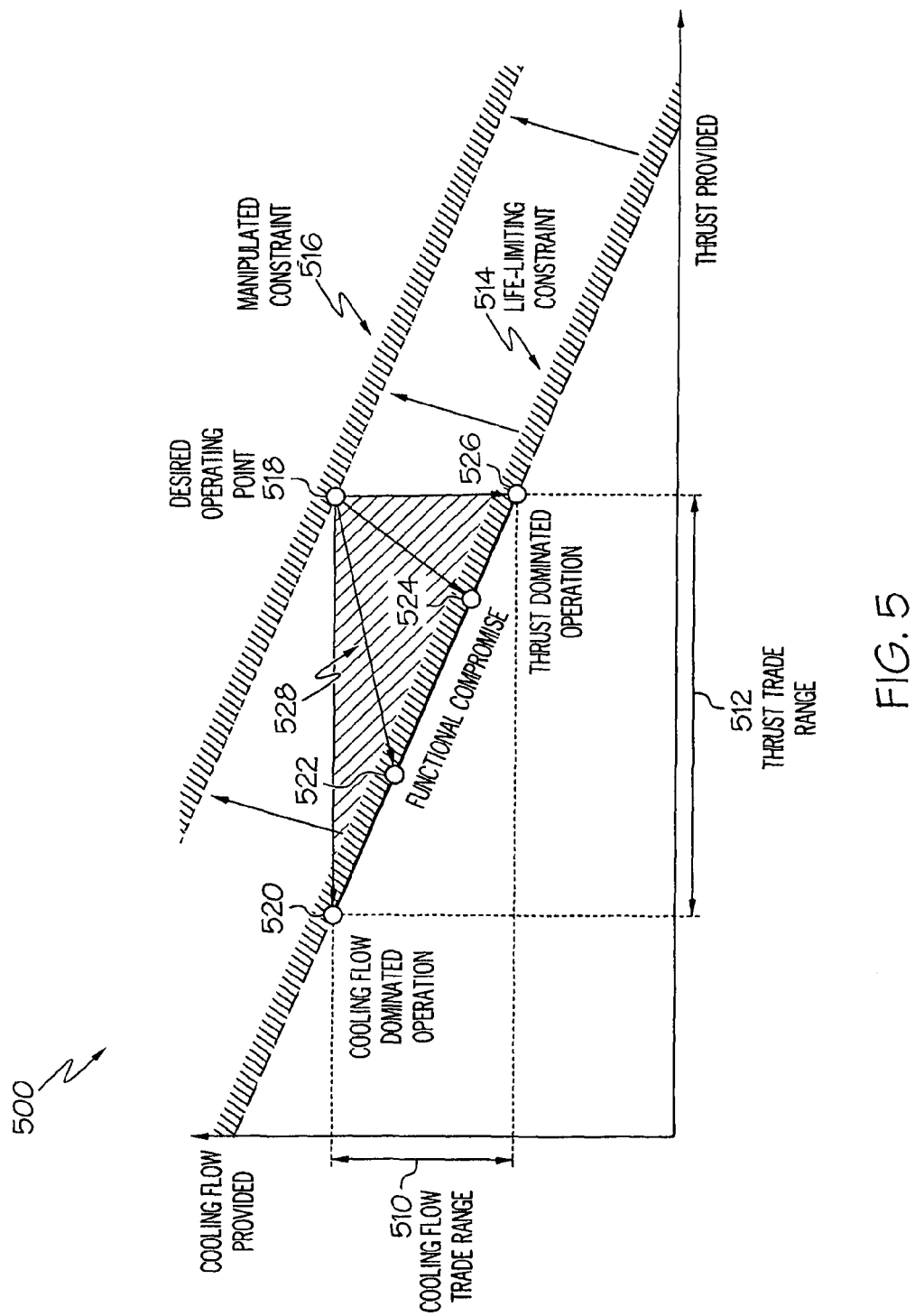
FIG. 5 is a simplified plot of thrust in relation to cooling flow for a turbine engine, showing possible trade-offs to achieve a desired operating point.

Referring now to FIGS. 3-5, additional details illustrating the operation of the limit management system 146 are shown in an exemplary plot 300. In FIG. 3, the available power 312 and required fuel flow 314 are shown in relation to the allocation of power extraction between the LP and HP shafts 114, 120, in the context of a system in which all of the components are functioning normally. The arrow 326 indicates the direction of increasing power and increasing fuel flow. The line 310 represents the optimal fuel efficiency at different power allocations; that is, the points at which both fuel efficiency and power are maximized for the different power allocations. Also shown in the plot 300 are a number of different component limit regions, including an engine temperature limit region 316, an LP shaft torque limit region 318, an LP generator torque limit region 320, a generator torque limit region 322, and a stability limit region 324. In some embodiments, these limit regions 316, 318, 320, 322, 324 represent soft limits while the boundary line separating each of the regions 316, 318, 322, 324 from other regions of the plot 300 represent hard limits, as described herein.

The points A, B, and C represent a current optimal operating point C and possible (or "candidate") operating point options (A and B) that may be generated by the system 146. In FIG. 3, the point A represents a possible operating point that may result if increasing power within the component limits is the primary objective, sacrificing a degree of efficiency. Point B represents a possible operating point if it is acceptable to exceed one of the component limits (engine temperature, in the illustration) and thus trade component life in order to maintain fuel efficiency while increasing power. The component lifing analysis is informed by the current observations of the engine 110, which are reflected in, for example, the system model 220.

FIG. 4 is similar to FIG. 3, except that FIG. 4 illustrates an exemplary plot 400 that represents an operating scenario in which a component failure has already occurred (a generator failure, represented by the arrow 410 in the illustration). As a result of the failure, the generator torque limit region 422 has changed in comparison to the corresponding region 322 of FIG. 3. In other words, a new component limit has been created by the component failure. To accommodate the component failure, the system 146 may generate possible (or "candidate") operating point options A and B. The point C represents a current optimal operating point. The possible option A represents an operating point that maintains optimal efficiency but reduces power. The possible option B represents an operating point that maintains power level at the expense of efficiency. As an example, it may be acceptable to sacrifice fuel efficiency, at least temporarily, if the vehicle currently has a large amount of fuel available. The system 146 can, in either of the scenarios of FIGS. 3 and 4, select one of the available options (e.g., A or B) or communicate the options to, e.g., the vehicle manager 210 for decision-making.

Referring now to FIG. 5, an exemplary plot 500 illustrating a relationship between two operating parameters, cooling flow and thrust, is shown. In the simplified example, cooling flow decreases as thrust increases and vice versa. The line 514 represents the relationship between cooling flow and thrust when a life-limiting constraint (such as temperature) is applied. Points 520, 522, 524, 526 represent possible operating points of the system 100 that do not violate the life-limiting constraint (or component limit). Point 520 may be a current operating point or selected by the system 146 if cooling flow is considered higher priority than thrust. Point 526 may be a current operating point or selected by the system 146 if thrust is considered higher priority than cooling flow. The system 146 may determine, based on a power demand and current operating conditions, for example, that a desired operating point may be point 518. However, achieving point 518 requires violating the life-limiting constraint 514. Accordingly, the system 146 (or the vehicle manager 210, as the case may be), can choose to manipulate the constraint (line 516), or accept some functional compromise while maintaining the current constraint (line 514). Points 522 and 524 represent functional compromises that, when compared to the point 518, reduce both thrust and cooling flow, but maintain the life-limiting constraint 514. Area 528 represents a region of available functional compromises that do not maintain the life-limiting constraint but achieve performance closer to the desired operating point 518. Region 510 represents the cooling flow trade range, in which cooling flow may be traded for increased thrust to maintain the life-limiting constraint. Similarly, region 512 represents the thrust trade range in which thrust may be traded for increased cooling flow to maintain the life-limiting constraint. In some embodiments, the data represented by the plots of FIGS. 3-5, e.g., operating parameters, parameter values, and relationships between the various parameters, may be stored in, for example, the system model 220.

Figure 6:
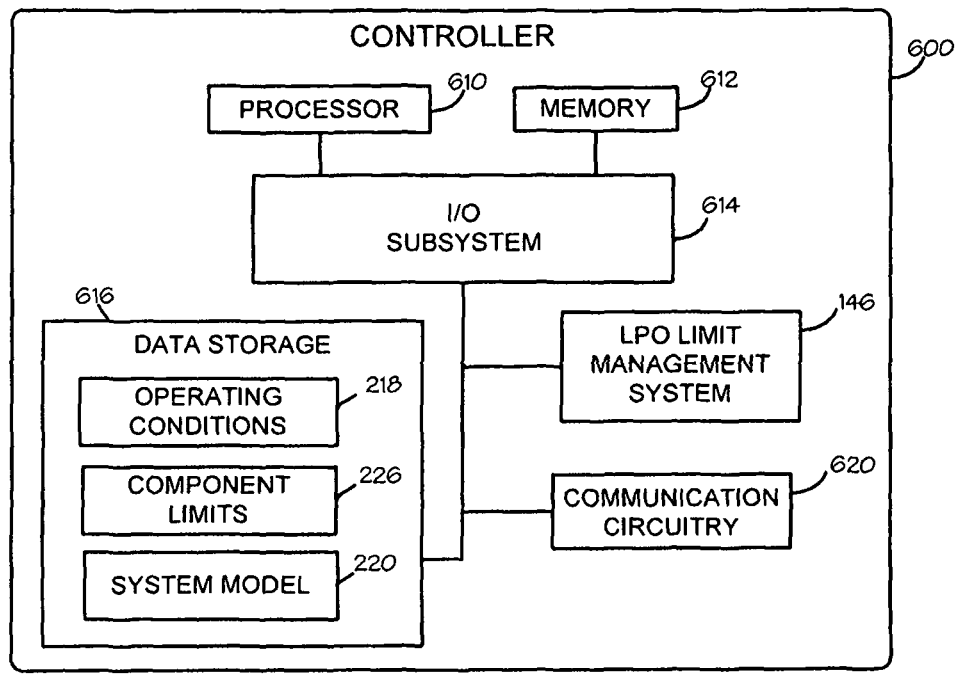
FIG. 6 is a simplified block diagram of a controller for a turbine engine.

Referring now to FIG. 6, a simplified block diagram of an exemplary controller 600, in which the limit management system 146 may be embodied, is shown. The controller 600 includes at least one processor 610 (e.g. a microprocessor, microcontroller, digital signal processor, etc.), memory 612, and an input/output (I/O) subsystem 614. The controller 600 and/or portions thereof may be embodied in a control unit of the engine 110, or may be distributed among various other control units of the system 100, for example. The I/O subsystem 614 typically includes, among other things, an I/O controller, a memory controller, and one or more I/O ports. The processor 610 and the I/O subsystem 614 are communicatively coupled to the memory 612. The memory 612 may be embodied as any type of suitable computer memory device (e.g., volatile memory such as various forms of random access memory). The I/O subsystem 614 is communicatively coupled to one or more storage media 616, the limit management system 146, and communication circuitry 620. The storage media 616 may include any suitable data storage device (e.g., persistent storage such as flash memory, memory cards, etc.). The storage media 616 may store data and/or computer instructions relating to engine operating conditions 218, component limits 226, and/or the system model 220. The communication circuitry 620 may include any suitable electronic communications link, bus, or network and may be configured to communicate control signals from the limit management system 146 to, for example, the generator control units 140, 142, the engine controller 144, or the thermal system control unit 152, and/or to communicate engine operating parameters from the engine 110 and/or sensors 160 to the limit management system 146. The controller 600 may include other components, sub-components, and devices not illustrated in FIG. 6 for clarity of the description. In general, the components of the controller 600 are communicatively coupled as shown in FIG. 6 by electronic signal paths, which may be embodied as any type of wired or wireless signal paths capable of facilitating communication between the respective devices and components.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine. For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation of the system 100.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

What is claimed is:

1. A control for a turbine engine system comprising a plurality of components including a multi-shaft turbine engine and one or more electrical machines coupled to the shafts of the turbine engine, the control comprising:
   a vehicle manager;
   a constraint analyzer to determine applicable component limits based on current operating conditions of the turbine engine system, wherein each of the component limits defines an operating region in which, if the component limit is exceeded, the life or safety of the component may be compromised; and
   a limit management optimizer to generate a desired operating point and one or more possible operating points for the system based on the current operating conditions, the applicable component limits, and an optimization objective, wherein the one or more possible operating points each represents an objective trade-off involving a modification of the optimization objective to maintain the component limits or a modification of one or more of the component limits;
   wherein the limit management optimizer communicates data relating to the desired operating point and the possible operating points to the vehicle manager, and the vehicle manager selects the desired operating point or one of the possible operating points based on a trade-off between two or more of performance, efficiency, lifing, reliability, and stability;
   wherein the limit management optimizer communicates a control signal to one or more system controllers for the system to achieve the selected operating point, and wherein the one or more system controllers control the turbine engine system to achieve the selected operating point in response to the control signal.

2. The control of claim 1, wherein the control signal comprises a power extraction control signal and the control communicates the control signal to a generator control unit configured to control the operation of a generator coupled to one of the shafts of the turbine engine system.

3. The control of claim 1, wherein the component limits comprise one or more soft limits that if exceeded, result in a non-fatal penalty to the operation of the system.

4. The control of claim 1, wherein the component limits comprise one or more hard limits that if exceeded, result in a failure of a component of the system.

5. The control of claim 1, wherein the optimization objective comprises one or more of performance, efficiency, lifing, reliability and stability.

6. The control of claim 1, wherein the vehicle manager communicates the selected operating point to the control.

7. The control of claim 1, wherein the constraint analyzer uses a system model to determine the applicable component limits, and the system model comprises data relating to an estimated state of the system.

8. A method for controlling the allocation of power extracted from a plurality of shafts of a turbine engine during operation of the turbine engine, the shafts having one or more electrical machines coupled thereto, the method comprising:
   analyzing current operating conditions of the turbine engine;
   determining a optimization objective, the optimization objective being defined to maximize one of performance, efficiency, component lifing, reliability, and stability of the turbine engine;
   determining a component limit based on the current operating conditions, the component limit relating to a component of the turbine engine;
   determining a desired operating point for the turbine engine based on the current operating conditions and the optimization objective,
   determining whether the desired operating point violates the component limit;
   determining one or more possible operating points for the turbine engine, each of the possible operating points representing one of an objective trade-off involving a modification of the optimization objective to maintain the component limit and a modification of the component limit;

communicating data relating to the desired operating point and the possible operating points to a vehicle manager;

selecting, by the vehicle manager, the desired operating point or one of the possible operating points based on a trade-off between two or more of performance, efficiency, lifing, reliability, and stability;

sending a control signal to a controller to control the operation of one or more of the electrical machines, wherein the control signal relates to the desired operating point or one of the possible operating points; and controlling, by the controller, the operation of the one or more of the electrical machines to achieve the selected operating point in response to the control signal.

9. The method of claim 8, comprising receiving data relating to the desired operating point and/or one or more of the possible operating points from the vehicle manager.

10. A control for a turbine engine system including a multi-shaft turbine engine and one or more electrical machines coupled to the shafts, the control being configured to perform the method of claim 8.

* * * * *